US005485598A

United States Patent [19]
Kashima et al.

[11] Patent Number: 5,485,598
[45] Date of Patent: Jan. 16, 1996

[54] REDUNDANT DISK ARRAY (RAID) SYSTEM UTILIZING SEPARATE CACHE MEMORIES FOR THE HOST SYSTEM AND THE CHECK DATA

[75] Inventors: Rika Kashima; Shunichiro Nakamura; Harumi Minemura; Katsumi Shiono; Masahiro Higuchi; Mikio Yoshimori; Takayuki Hayakawa, all of Kamakura, Japan

[73] Assignee: Nitsubishi Denki Kabushiki Kaisha, Tokyo, Japan

[21] Appl. No.: 53,100

[22] Filed: Apr. 26, 1993

[30] Foreign Application Priority Data

May 13, 1992 [JP] Japan .................................. 4-120883
Jul. 22, 1992 [JP] Japan .................................. 4-195004

[51] Int. Cl.⁶ ................................................. G06F 13/00
[52] U.S. Cl. .................. 395/182.04; 395/446; 395/449; 395/439; 395/440; 395/441; 395/405; 364/243.45; 364/243.44; 364/DIG. 1
[58] Field of Search ..................................... 395/425, 439, 395/440, 441, 446, 449; 364/243.44, 243.45; 371/40.4

[56] References Cited

PUBLICATIONS

Patterson, Gibson & Katz "A Case for Redundant Arrays of Inexpensive Disks (RAID)", U. of Cal. 1988.
IBM Technical Disclosure Bulletin, Dec. 1989, pp. 5–7

"Performance Assist for Checksum DASD".
Computer Technology Review, Jun. 1991, pp. 24–29 "Disk Array is Moving up to Raid 6 Option".
Computer Technology Review, May 1992, pp. 43–47 "Raid 7 Architecture Features Asynchronous Data Transfers".

*Primary Examiner*—Tod R. Swann
*Assistant Examiner*—Frank J. Asta
*Attorney, Agent, or Firm*—Wolf, Greenfield & Sacks

[57] ABSTRACT

A memory device with a redundant disk array. In order to quicken the processing of data writing into the redundant disk array, a first cache memory for accessing the redundant disk array, a second cache memory for storing old data of the first cache memory when the data of the first cache memory are renewed, and a third cache memory for storing old CK data read out of the redundant disk array when the data of the first cache memory are renewed are provided. New CK data are produced from new data for the renewal, old data stored in the second cache memory and old CK data stored in the third cache memory, and the new data for the renewal and the new CK data are stored into data storage means and CK data storage means of the redundant disk array. Since, the data read out of the cache memories are processed without reading the old data and the old CK data out of the redundant disk array, the number of accesses into the disk array at a data writing time can be reduced, and data writing can be performed at a quick speed.

30 Claims, 14 Drawing Sheets

REDUNDANT DISK ARRAY (RAID) SYSTEM UTILIZING SEPARATE CACHE MEMORIES FOR THE HOST SYSTEM AND THE CHECK DATA

BACKGROUND OF THE INVENTION i) Field of the Invention

The present invention relates to a memory device with a redundant disk array connected to a computer and a disk cache for storing data read out of disk units of the disk array.

ii) Description of the Related Arts

An array disk device has been known to the public since the University of California at Berkeley (UCB) in the U.S.A. published a thesis about this, and recently a number of documents and patents concerning this array disk system have been published. FIG. 1 shows a conventional memory device explained as raid level 5 in "A Case for Redundant Arrays of Inexpensive Disks (Raid)", by David A. Patterson, Barth Gibson and Randy H. Kats, UCB Report No. UCB/CSD 87/391, December, 1987. In FIG. 1, a disk array device 1 includes four disk units 2a, 2b, 2c and 2d and an exclusive OR arithmetic unit 3 for producing new CK (check) data. The disk units 2a, 2b, 2c and 2d store respective data 4a, 4b and 4c and CK data 5 and constitute a redundant group. The CK data 5 represents an exclusive OR calculation result of the data 4a, 4b and 4c. In this case, for example, any data 4a in the redundant group can be produced by an exclusive OR of the other data 4b and 4c in the same redundant group and the CK data 5. Hence, when the data within any one disk in the same redundant group becomes corrupted, the corrupted data can be reproduced from the other data within the other disks and the CK data to realize a recovery function.

Next, the operation of the above-described conventional memory device will now be described in connection with FIGS. 2 and 3. FIG. 2 is a schematic conceptional view of the processing of the memory device shown in FIG. 1, and FIG. 3 shows a flow chart of the processing of the same.

First, a data readout from the disk array device 1 is carried out in the same manner as a usual disk device. In turn, a data write processing operation is performed as follows. That is, first, new data 6 are received from a computer 10 in step S1, and old data 7 are read out of the disk unit 2a in step S2. Next, old CK data 8 are read out of the disk unit 2d in step S3. After the necessary data are prepared as described above, the exclusive OR arithmetic unit 3 executes an exclusive OR calculation by using the new data 6, the old data 7 and the old CK data 8 to produce new CK data 9 in step S4. Then, the new data 6 are written into the disk unit 2a in step S5 and the new CK data 9 are written into the disk unit 2d in step S6. As a result, the processing is finished.

As described above, in the conventional memory device, in order to produce the new CK data 9 when writing data into the disk array device 1, the old data 7 and the old CK data 8 are read out of the respective disk units 2a and 2d and the readout data are fed into the exclusive OR arith-metic unit 3 to carry out the exclusive OR by using the new data 6, the old data 7 and the old CK data 8. Then, the obtained new CK data 9 and the new data 6 are written into the respective disk units 2d and 2a. Hence, in this case, at the data writing time, four accesses into the disk units are required and thus the data writing speed is slow, which is an obstacle to high speed operation.

SUMMARY OF THE INVENTION

It is therefore an object of the present invention to provide a memory device with a disk array device in view of the aforementioned problems of the prior art, which is capable of reducing a number of access times into disk units when data are written into the disk array device, to quicken a data writing operation speed.

In order to achieve the object, a memory device with a redundant disk array according to the present invention includes redundant disk array means having a plurality of data storage means for storing data and a CK data storage means for storing CK data, and processing means for accessing the redundant disk array means. The memory device further includes the following components provided in either the redundant disk array means or the processing means, that is a first cache memory means for accessing the redundant disk array means; second cache memory means for storing old data of the first cache memory means when the data of the first cache memory means are renewed; third cache memory means for storing old CK data read out of the redundant disk array means when the data of the first cache memory means are renewed; arithmetic means for producing new CK data from new data for the renewal operation, the old data stored in the second cache memory means and the old CK data stored in the third cache memory means; and control means for allowing storing of the new data for renewal in the data storage means and the new CK data in the CK data storage means in the redundant disk array means.

The first cache memory means can be provided in the processing means, and the second and third cache memory means can be provided in the redundant disk array means. The first and second cache memory means can be provided in the processing means, and the third cache memory means can be provided in the redundant disk array means. The first, second and third cache memory means can be provided in the processing means. The first, second and third cache memory means can be provided in the redundant disk array means.

The arithmetic means executes an exclusive OR calculation by using the new data for renewal, the old data stored in the second cache memory means and the old CK data stored in the third cache memory means to produce the new CK data.

In the memory device of the present invention, when the data are written into the redundant disk array means, the old data and the old CK data read out of the cache memory means are processed without reading out of the redundant disk array means. Hence, the number of accesses to the disk array means at a data writing time can be reduced and data writing can be performed at high speed.

BRIEF DESCRIPTION OF THE DRAWINGS

The objects, features and advantages of the present invention will become more apparent from the consideration of the following detailed description, taken in conjunction with the accompanying drawings, in which.

DESCRIPTION OF THE PREFERRED EMBODIMENTS

Figure 1:
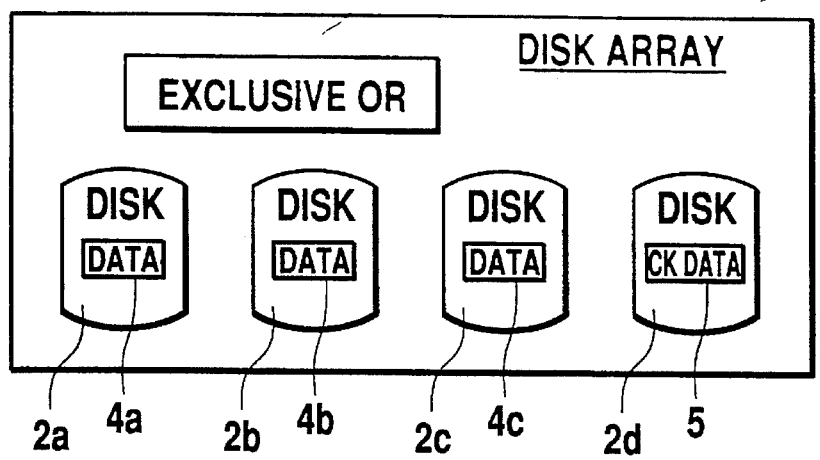
FIG. 1 is a block diagram of a conventional memory device.
Figure 2:
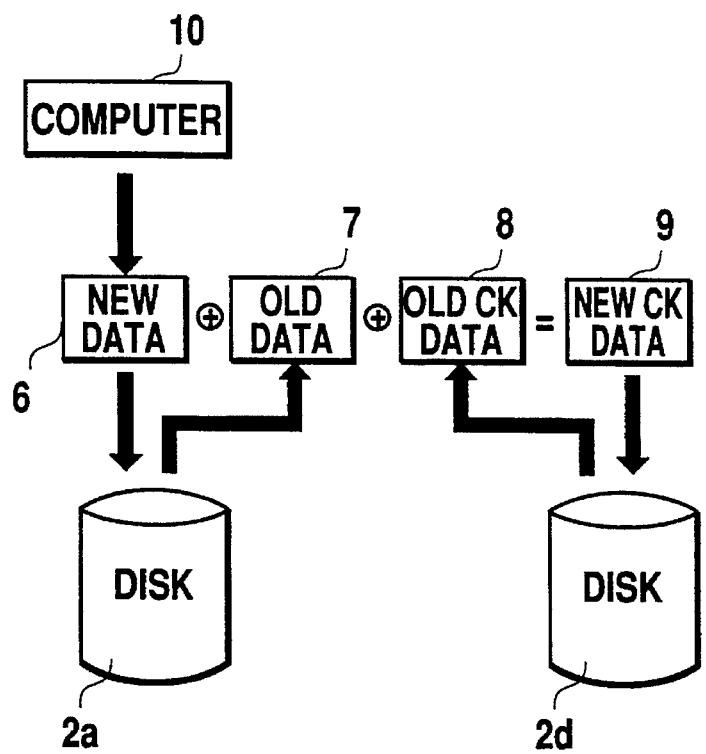
FIG. 2 is a schematic conceptional view of the processing of the memory device shown in FIG. 1.
Figure 3:
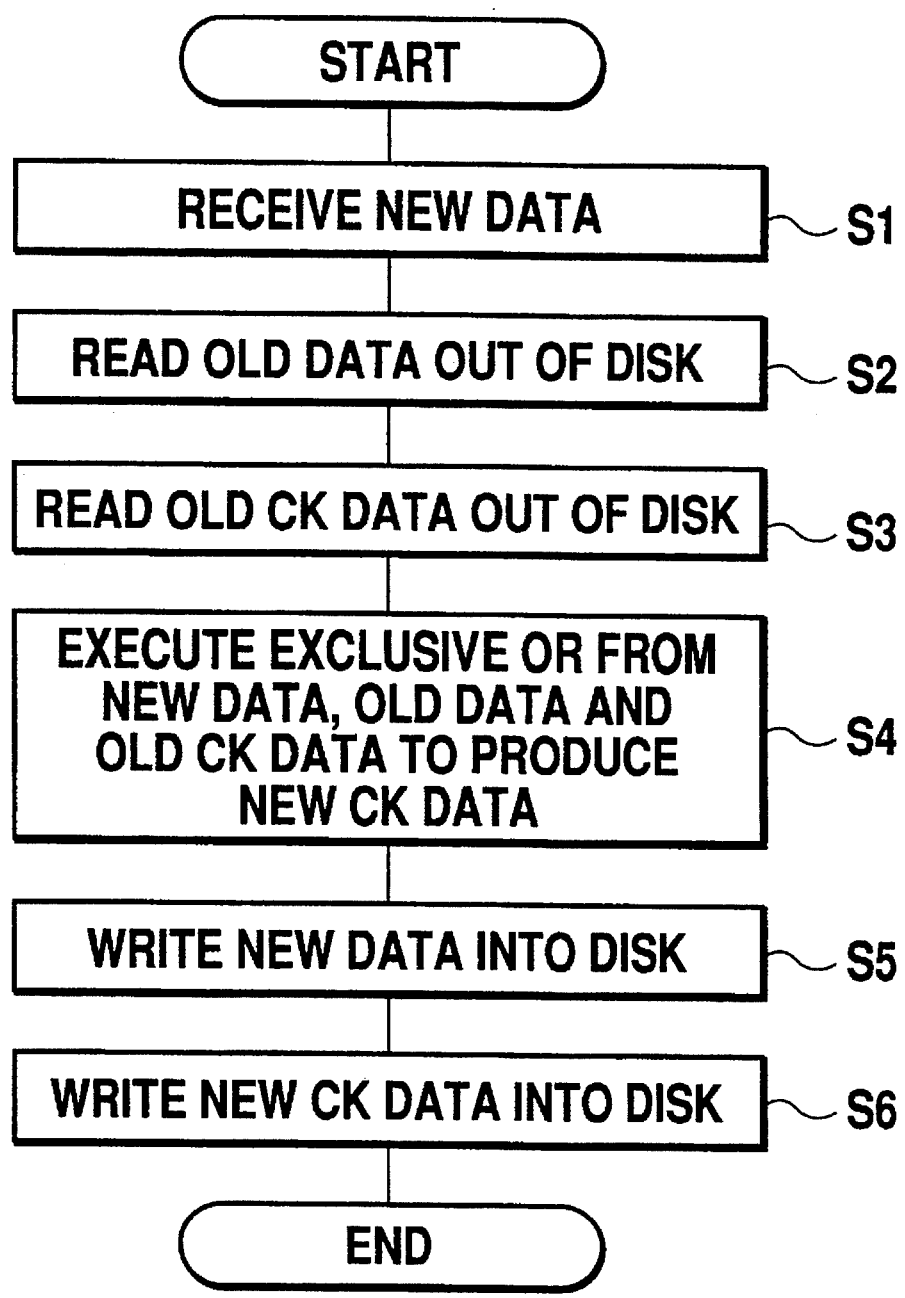
FIG. 3 is a flow chart showing an operation of the memory device shown in FIG. 1.
Figure 4:
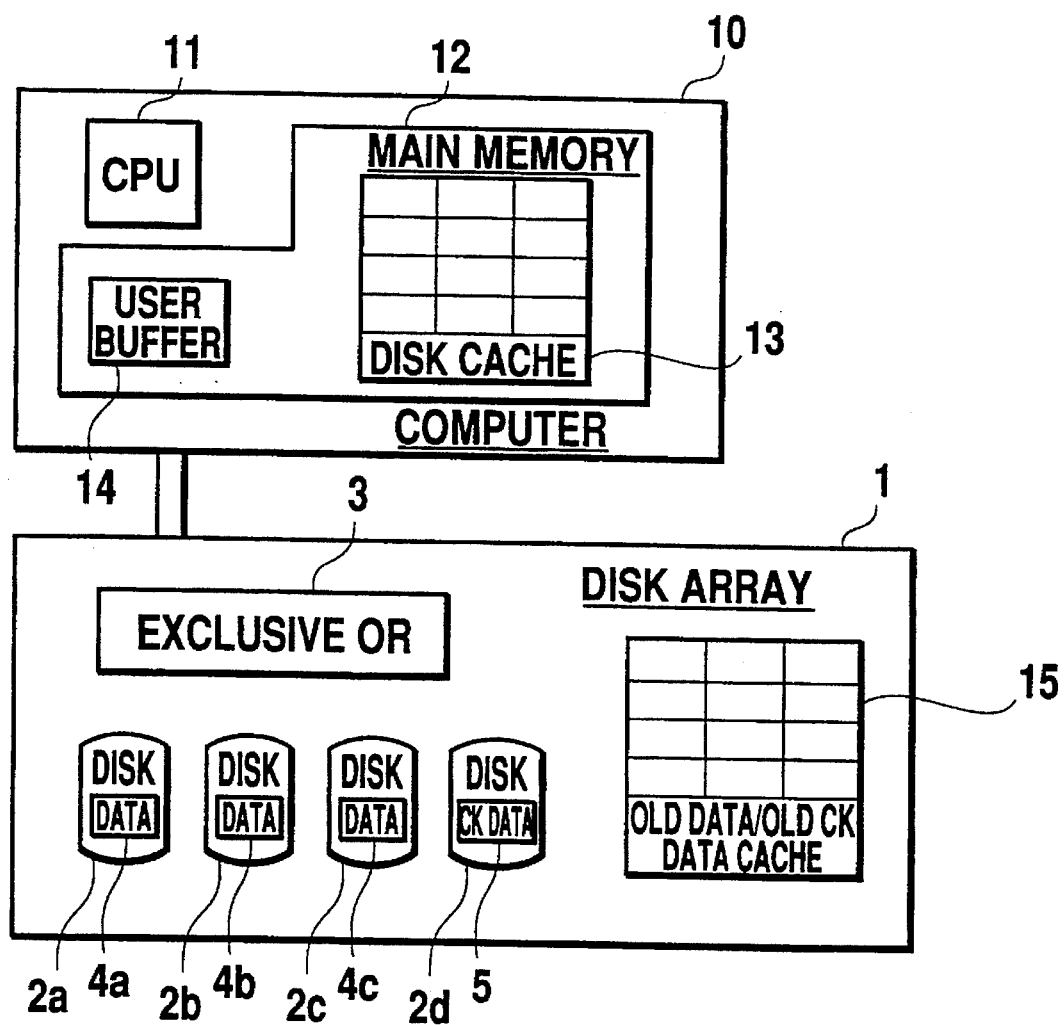
FIG. 4 is a block diagram of a first embodiment of a memory device according to the present invention.

Referring now to the drawings, wherein like reference characters designate like or corresponding parts throughout the views and thus the repeated description thereof can be omitted for brevity, there is shown in FIG. 4 the first embodiment of a memory device according to the present invention.

In FIG. 4, a disk array device 1 includes four disk units 2a, 2b, 2c and 2d for storing respective data 4a, 4b and 4c and CK (check) data 5, an exclusive OR arithmetic unit 3 for producing new CK data, and a cache 15 for storing old data/old CK data. A computer 10 connected to the disk array device 1 includes a CPU 11 and a main memory 12 having a disk cache 13 and a user buffer 14.

In this embodiment, the disk cache 13 and the user buffer 14 store or hold data blocks read out of the four disk units 2a, 2b, 2c and 2d and directly read out the held data blocks so as to quicken a response without re-accessing the disk units 2a, 2b, 2c and 2d when a readout request of the data blocks held in the disk units 2a, 2b, 2c and 2d is given again. On the other hand, the old data/old CK data cache 15 stores old data 7 and old CK data 8 read out of the disk units 2a, 2b, 2c and 2d at the data writing time in the disk array device 1.

Figure 5:
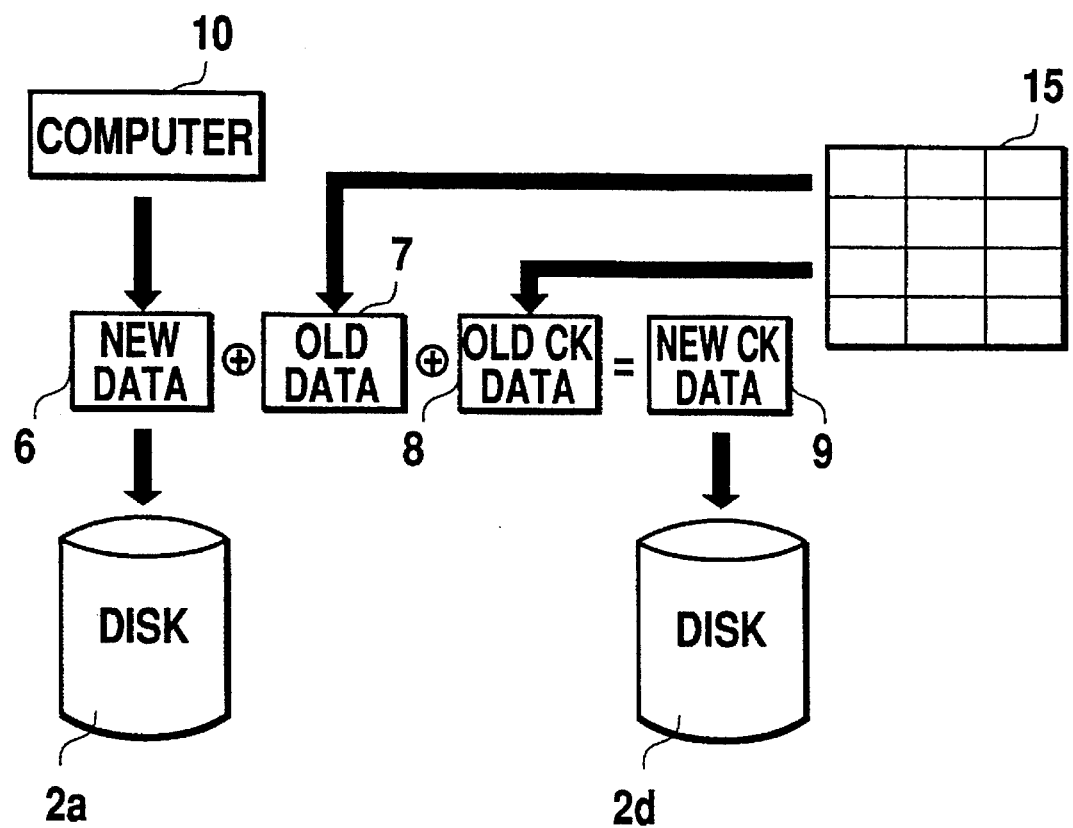
FIG. 5 is a schematic conceptional view of the processing of the memory device shown in FIG. 4.
Figure 6:
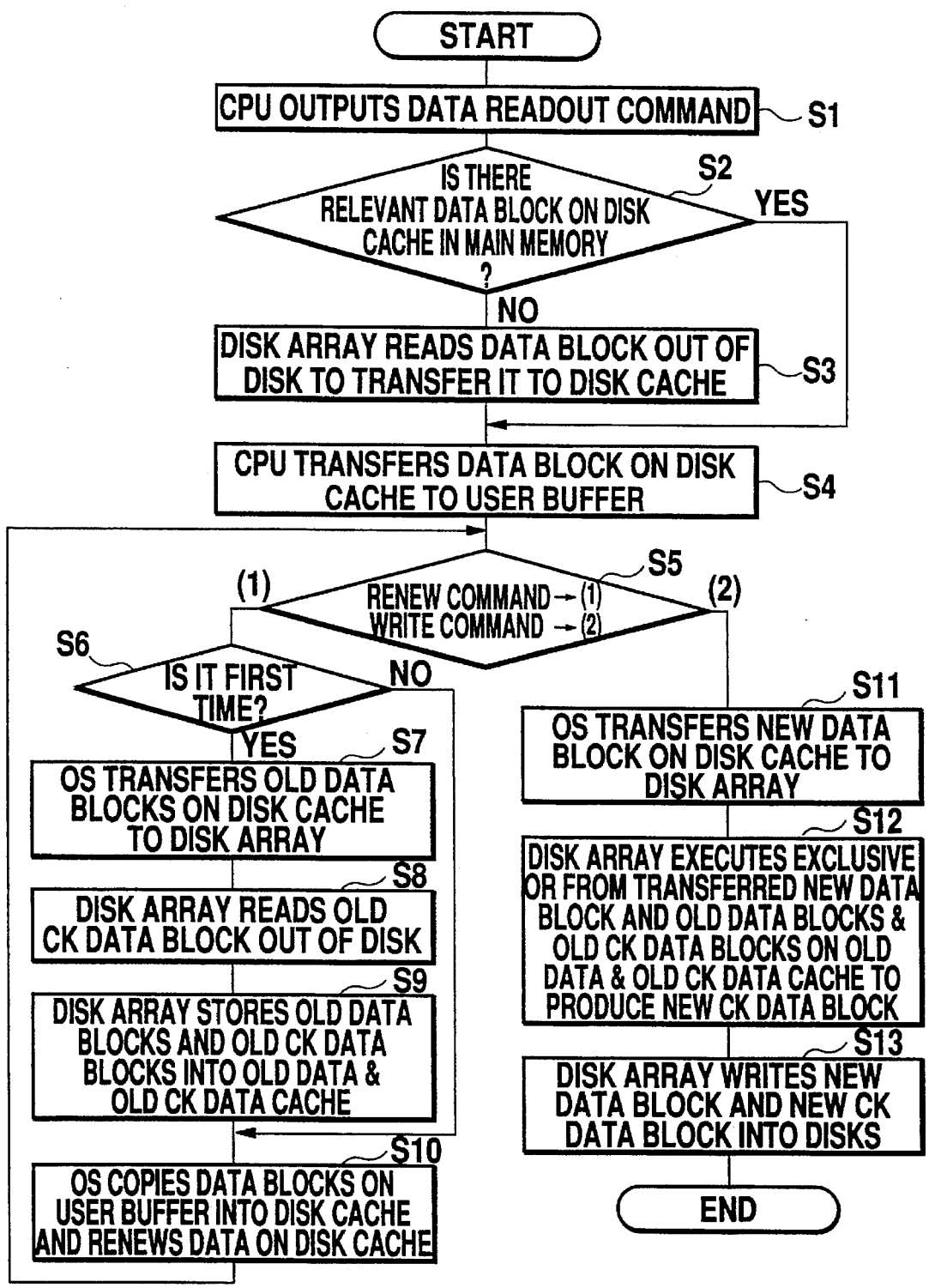
FIG. 6 is a flow chart showing an operation of the memory device shown in FIG. 4.

Next, the operation of the above-described memory device shown in FIG. 4 will now be described in connection with FIGS. 5 and 6. FIG. 5 is a schematic conceptional view of the processing of the memory device shown in FIG. 4, and FIG. 6 shows a flow chart of the processing of the same.

First, a data readout command is output from the CPU 11 of the computer 10 in step S1. In this case, it is discriminated whether or not there is a relevant data block on the disk cache 13 in the main memory 12 in step S2. When there is no relevant data block in the disk cache 13 as discriminated in step S2, the data block of the data 4a is read out of the disk unit 2a of the disk array device i to transfer the readout data block to the disk cache 13 in step S3. In turn, when there is the relevant data block in the disk cache 13 as discriminated in step S2, the process is moved to step S4, and in step S4, the data block already present in or transferred to the disk cache 13 is transferred to the user buffer 14 in the main memory 12 by the CPU 11.

In step S5, it is discriminated whether it is a renew command (1) or a write command (2) of the data block on the disk cache 13. When it is discriminated that it is the renew command (1), the process is moved to step S6. In step S6, it is discriminated whether or not it is the first renew command. When it is discriminated that it is the first renew command in step S6, first, in step S7, an OS (operating system) transfers this data, that is, the old data block on the disk cache 13 to the disk array device 1. In step S8, the disk array device 1 receives the old data block, stores the old data block in the old data/old CK data cache 15 and reads the old CK data block out of the disk unit 2d, and in step S9, the disk array device 1 stores the readout old CK data blocks into the old data/old CK data cache 15. Next, in step S10, the OS copies the data blocks on the user buffer 14 of the main memory 12 into the disk cache 13 and updates from the old data to new data in the data blocks on the disk cache 13.

Further, when it is discriminated that the second or subsequent renew command in step S6, the OS jumps the process to step S10, copies the data blocks on the user buffer 14 into the disk cache 13 as it is and renews the data blocks on the disk cache 13.

Then, after finishing the processing up to step S10, the process is returned to step S5.

On the other hand, in step S5, when it is discriminated that it is the write command (2) of the data on the disk cache 13 into the disk array device 1, the OS moves to step S11 and transfers the new data block in the disk cache 13 to the disk array device 1 in step S11. Next, in step S12, the disk array device 1 executes an exclusive OR calculation in the exclusive OR arithmetic unit 3 by using the block of the transferred new data 6 and the blocks of the old data 7 and the old CK data 8 on the old data/old CK data cache 15 to produce a block of the new CK data 9. Then, in step S13, the disk array device 1 writes the block of the new data 6 and the block of the produced new CK data 9 into the respective disk units 2a and 2d to finish the entire operation.

Through the above-described operation, when the new data 6 are written into the disk unit 2a from the computer 10, it is sufficient to access into each of the disk units 2a and 2d only once to realize quickening of the data writing operation.

In the first embodiment described above, although, when the renew command of the data block read onto the disk cache 13 is first output, the OS transfers the old data block to the disk array device 1 in step S7, in the system shown in FIG. 4, only addresses on the disk unit 2a of the old data blocks can be transferred to the disk array device 1.

Figure 7:
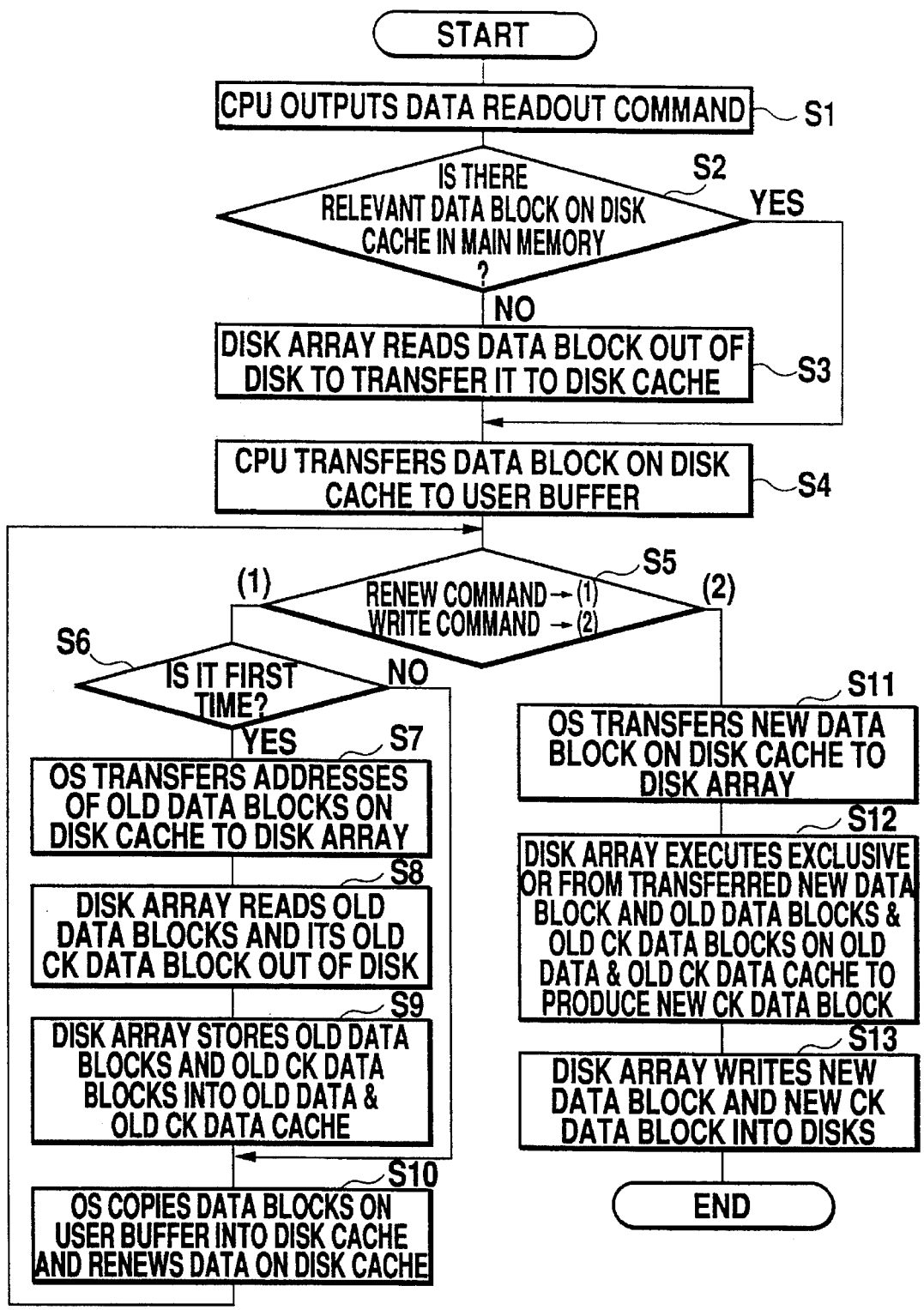
FIG. 7 is a flow chart showing an operation of a second embodiment of a memory device according to the present invention.

FIG. 7 shows a flow chart of processing of the second embodiment of a memory device according to the present invention, having the same steps in the system of the above-described first embodiment except step S7 and step S8. That is, in step S7, the OS transfers the addresses of the old data on the disk cache 13 to the disk array device 1, and in step S8, the disk cache 13 receives the addresses on the disk unit 2a of the old data block, reads the old data blocks and the old CK data block out of the disk units 2a and 2d. In this embodiment, the same effects as those of the first embodiment can be obtained.

Figure 8:
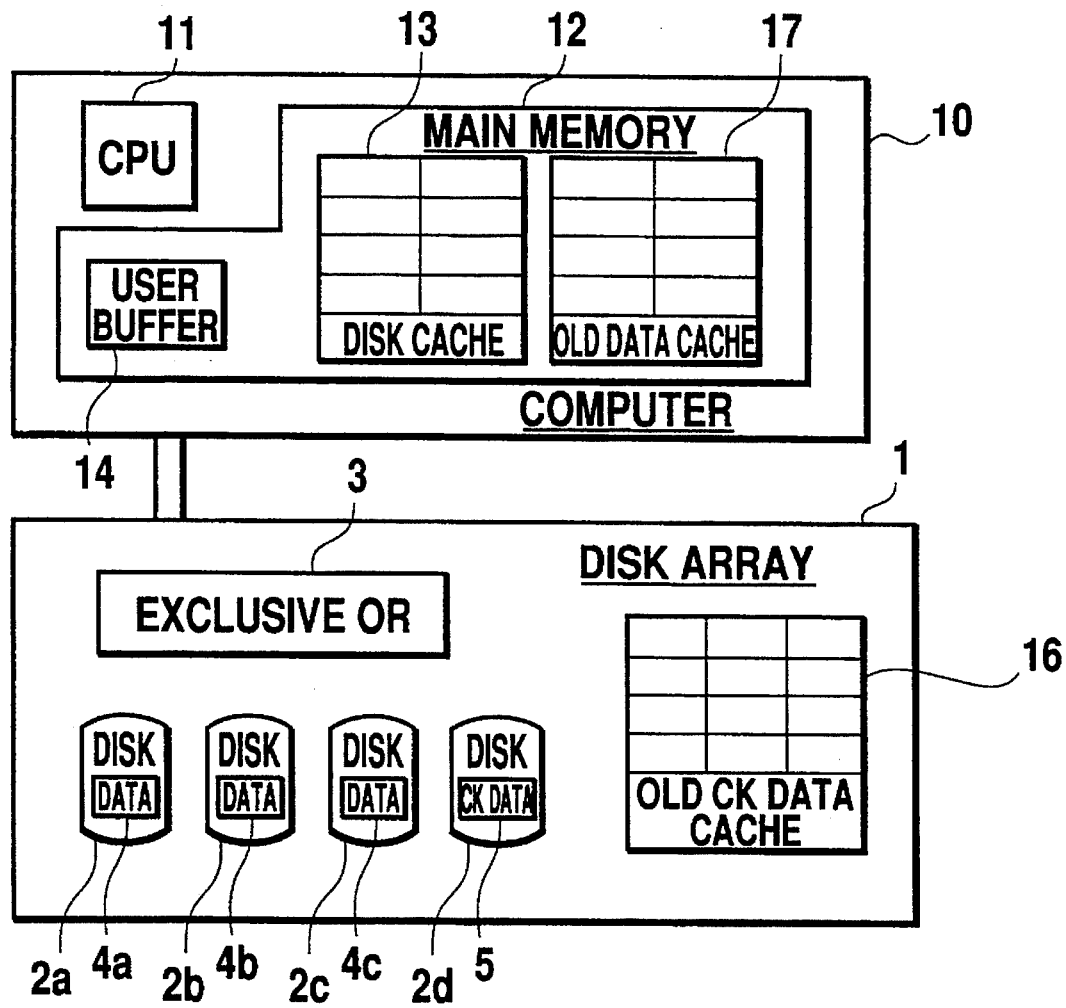
FIG. 8 is a block diagram of a third embodiment of a memory device according to the present invention.

In FIG. 8, there is shown the third embodiment of a memory device according to the present invention, having the same construction as the first embodiment shown in FIG. 4, except that the main memory 12 of the computer 10 includes an old data cache 17 and the disk array device 1 includes an old CK data cache 16 in place of the old data/old CK data cache 15.

Figure 9:
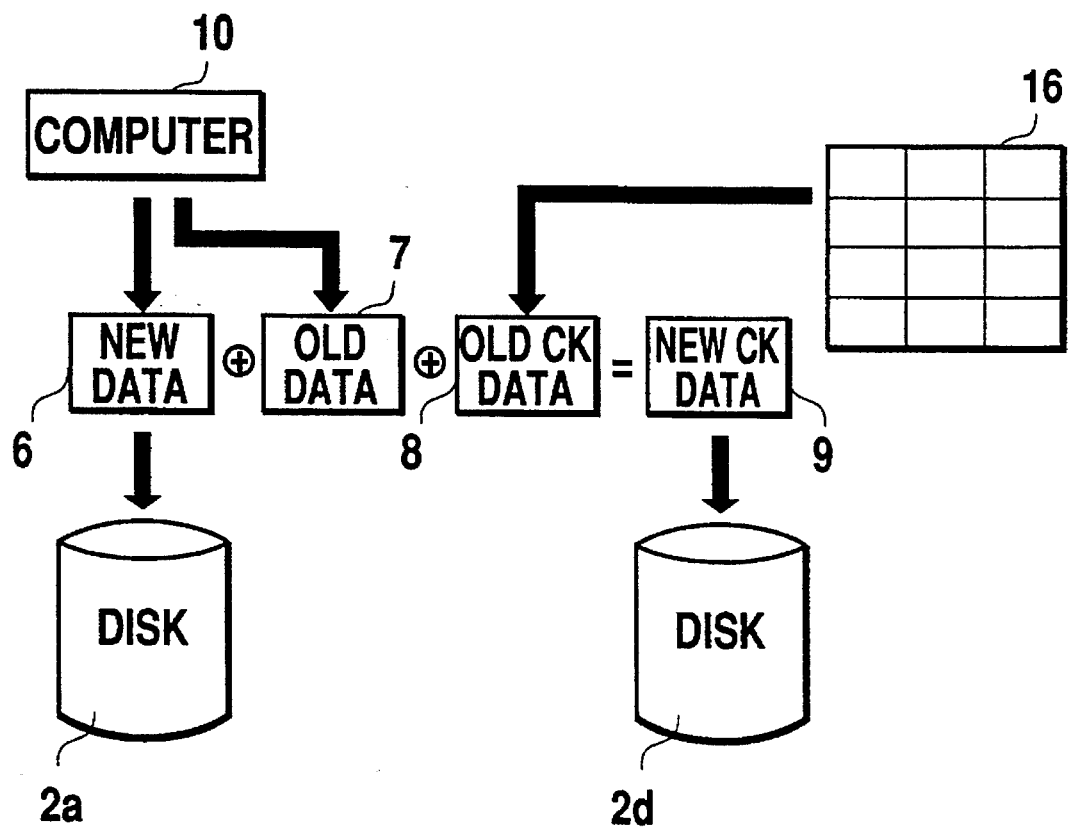
FIG. 9 is a schematic conceptional view of the processing of the memory device shown in FIG. 8.
Figure 10:
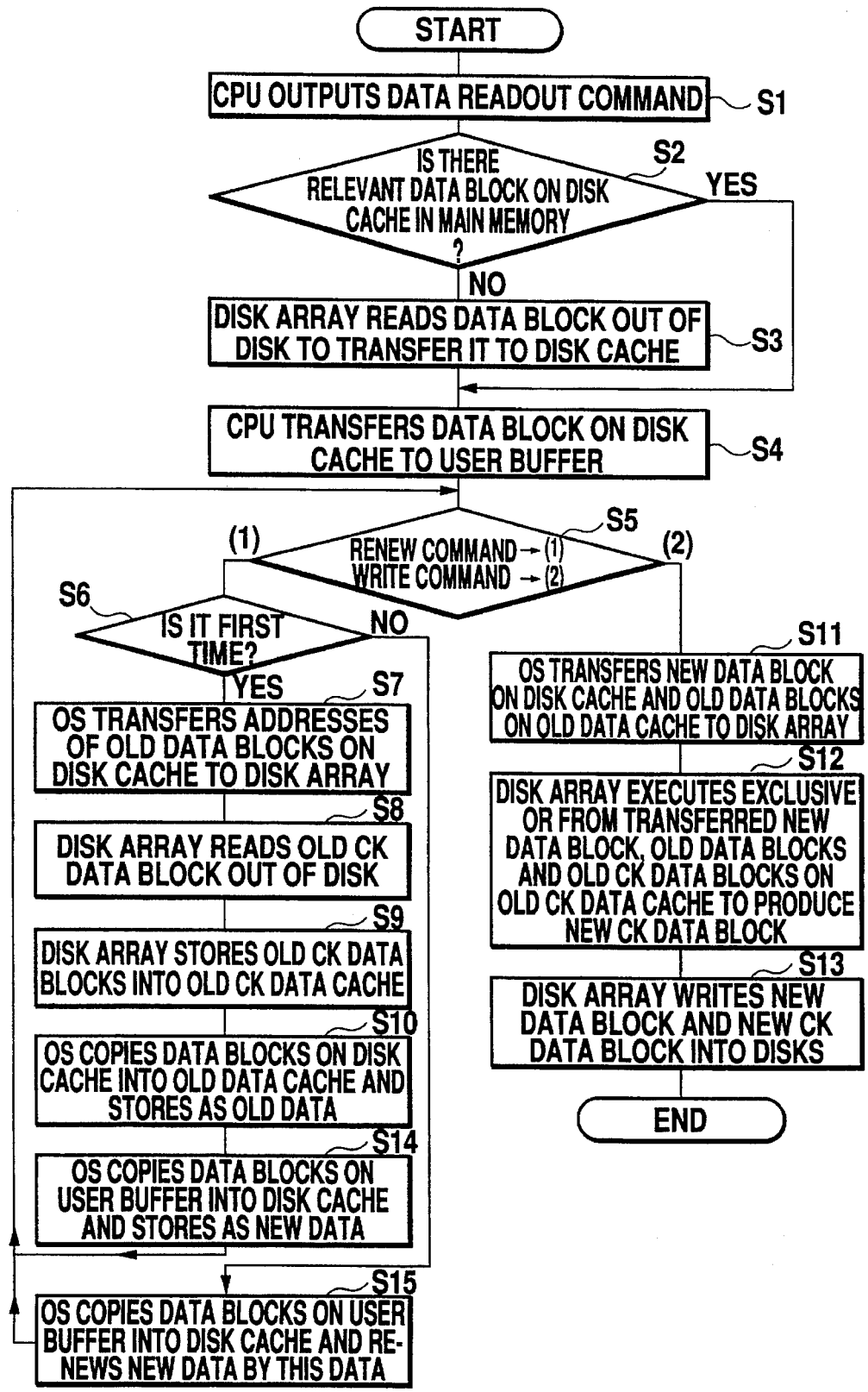
FIG. 10 is a flow chart showing an operation of the memory device shown in FIG. 8.

Next, the operation of the above-described memory device shown in FIG. 8 will now be described in connection with FIGS. 9 and 10. FIG. 9 is a schematic conceptional view of a processing of the memory device shown in FIG. 8, and FIG. 10 shows a flow chart of the processing of the same.

In this embodiment, step S1 to step S6 and step S13 are the same as those of the first embodiment and thus the description thereof can be omitted for brevity.

When it is discriminated in step S6 that it is the first renew command of the data block in the disk cache 13 on the main memory 12, in step S7, the OS transfers the addresses of the disk unit 2a of the old data blocks on the disk cache 13 to the disk array device 1. The disk array device i receives the addresses of the disk unit 2a, reads the old CK data block out of the disk unit 2d in step S8 and stores the readout old CK data blocks into the old CK data cache 16 in step S9. Then, in step S10, the OS copies the data blocks on the disk cache 13 into the old data cache 17 of the main memory 12 to store as the old data blocks therein and in step S14, the OS copies the data blocks of the user buffer 14 of the main memory 12 into the disk cache 13 to store as the new data blocks therein.

Further, when it is discriminated that it is the second or subsequent renew command in step S6, the OS jumps the process to seep S15, copies the data blocks in the user buffer 14 into the disk cache 13 to renew the data to the new data on the disk cache 13.

On the other hand, in step S5, when it is discriminated that it is the write command (2) of the data on the disk cache 13 into the disk array device 1, the OS moves to step S11 and transfers the new data block on the disk cache 13 and the old data blocks on the old data cache 17 to the disk array device 1 in step S11. Next, in step S12, the disk array device 1 executes an exclusive OR calculation in the exclusive OR arithmetic unit 3 by using the block of the transferred new data 6, the blocks of the old data 7 and the blocks of the old CK data 8 on the old CK data cache 16 to produce a block of the new CK data 9. Then, in step S13, the disk array device 1 writes the block of the new data 6 and the block of the produced new CK data 9 into the respective disk units 2a and 2d to finish the entire operation.

As a result of the above-described operation, when the new data 6 are written into the disk unit 2a from the computer 10, it is sufficient to access into each of the disk units 2a and 2d only once to realize quick data writing.

Figure 11:
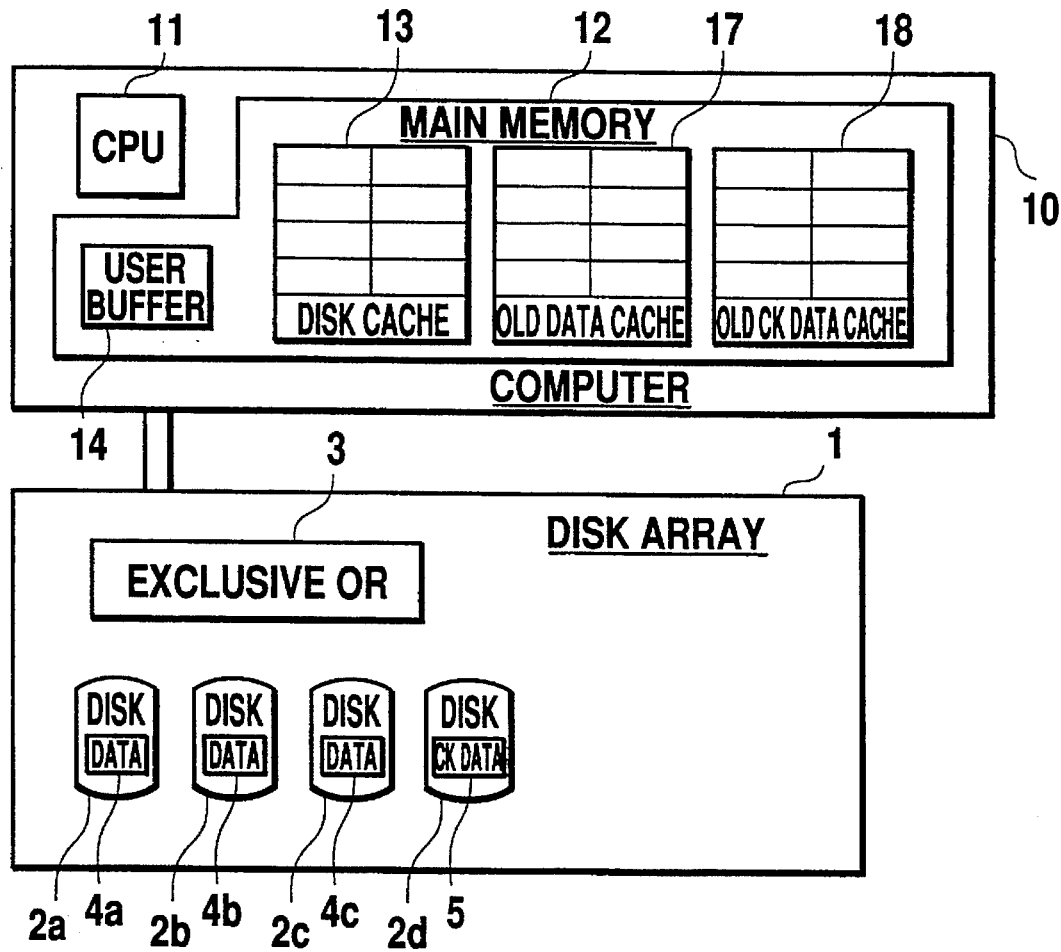
FIG. 11 is a block diagram of a fourth embodiment of a memory device according to the present invention.

In FIG. 11, there is shown the fourth embodiment of a memory device according to the present invention, having the same construction as the third embodiment shown in FIG. 8, except that the main memory 12 of the computer 10 further includes an old CK data cache 18 in place of the old CK data cache 16 provided in the disk array device 1.

Figure 12:
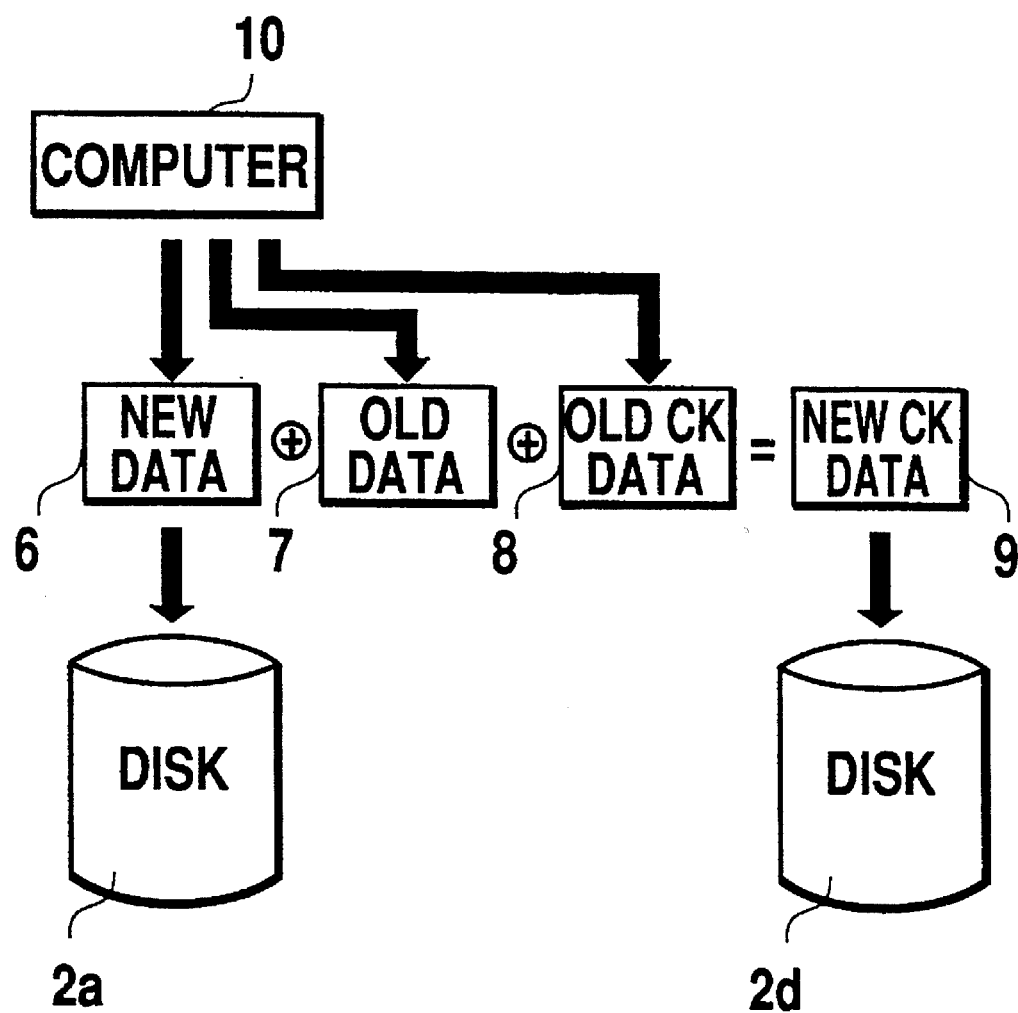
FIG. 12 is a schematic conceptional view of the processing of the memory device shown in FIG. 11.
Figure 13:
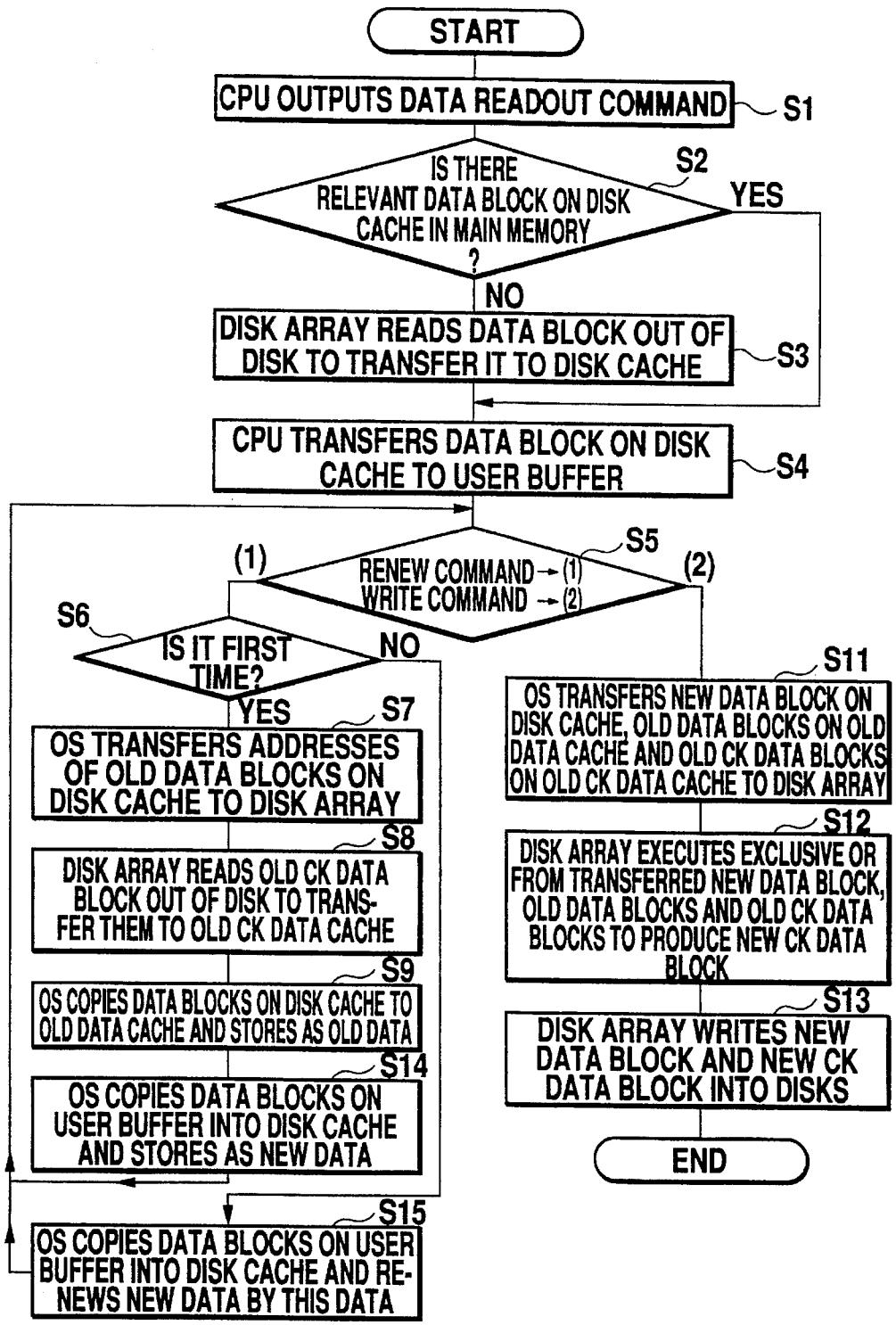
FIG. 13 is a flow chart showing an operation of the memory device shown in FIG. 11.

Next, the operation of the above-described memory device shown in FIG. 11 will now be described in connection with FIGS. 12 and 13. FIG. 12 is a schematic conceptional view of the processing of the memory device shown in FIG. 11, and FIG. 13 shows a flow chart of the processing of the same.

In this embodiment, step S1 to step S6 and step S13 to step S15 are the same as those of the third embodiment and thus the description thereof can be omitted for brevity.

When it is discriminated in step S6 that it is the first renew command of the data block in the disk cache 13 on the main memory 12, in step S7, the OS transfers the addresses of the disk unit 2a of the old data blocks on the disk cache 13 to the disk array device 1. In step S8, the disk array device 1 receives the addresses of the disk unit 2a, reads the old CK data block out of the disk unit 2d and transfers the readout old CK data blocks to the computer 10 connected to the disk array device 1, and the OS stores the transferred old CK data blocks into the old CK data cache 18. Next, in step S9, the OS copies the data blocks on the disk cache 13 into the old data cache 17 of the main memory 12 to store as the old data blocks therein, and in step S14, the OS copies the data blocks of the user buffer 14 of the main memory 12 into the disk cache 13 to store as the new data blocks therein.

On the other hand, in step S5, when it is discriminated that it is the write command (2) of the data on the disk cache 13 into the disk array device 1, in step S11, the OS transfers the new data block on the disk cache 13, the old data blocks on the old data cache 17 and the old CK data blocks on the old CK data cache 18 to the disk array device 1. Next, in step S12, the disk array device 1 executes an exclusive OR calculation in the exclusive OR arithmetic unit 3 by using the block of the transferred new data 6, the blocks of the old data 7 and the blocks of the old CK data 8 to produce a block of the new CK data 9. Then, in step S13, the disk array device 1 writes the block of the new data 6 and the block of the produced new CK data 9 into the respective disk units 2a and 2d to finish the entire operation.

As a result of the above-described operation, when the new data 6 are written into the disk unit 2a from the computer 10, it is sufficient to access into each of the disk units 2a and 2d only once to realize quickening of the data writing operation.

Figure 14:
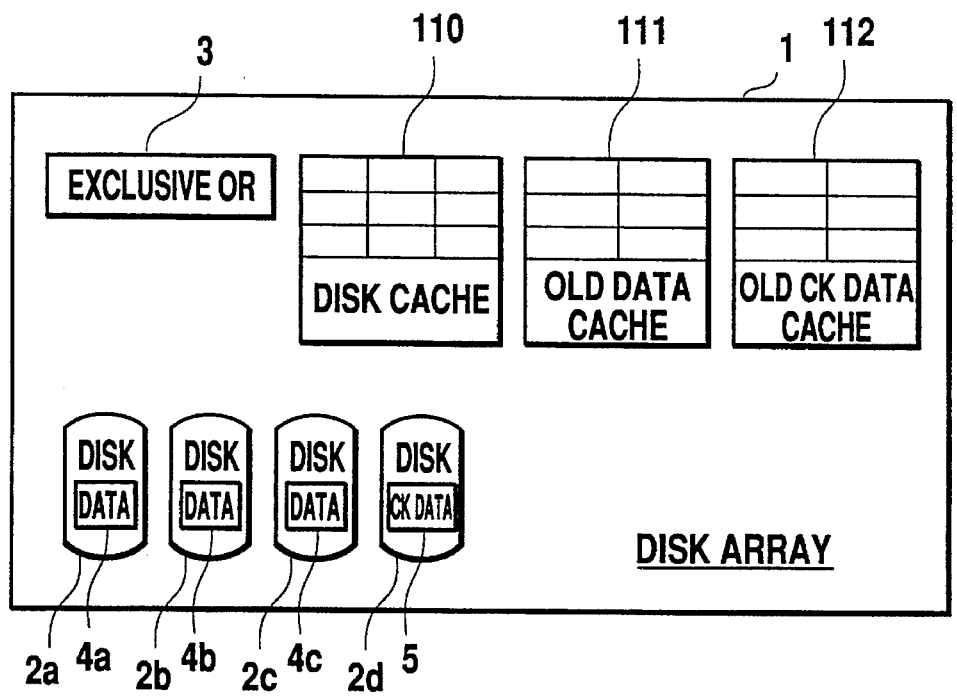
FIG. 14 is a block diagram of a fifth embodiment of a memory device according to the present invention.

In FIG. 14, there is shown the fifth embodiment of a memory device according to the present invention. In this embodiment, a disk array device 1 incudes four disk units 2a, 2b, 2c and 2d for storing respective data 4a, 4b and 4c and CK (check) data 5, an exclusive OR arithmetic unit 3 for producing new CK data, a disk cache 110 for storing or holding data blocks read out of the four disk units 2a, 2b, 2c and 2d and directly reading out the held data blocks so as to quicken a response without accessing into the disk units 2a, 2b, 2c and 2d again when a readout request of the data blocks held in the disk units 2a, 2b, 2c and 2d is given again, an old data cache 111 for storing old data and an old CK data cache 112 for storing old CK data.

Figure 15:
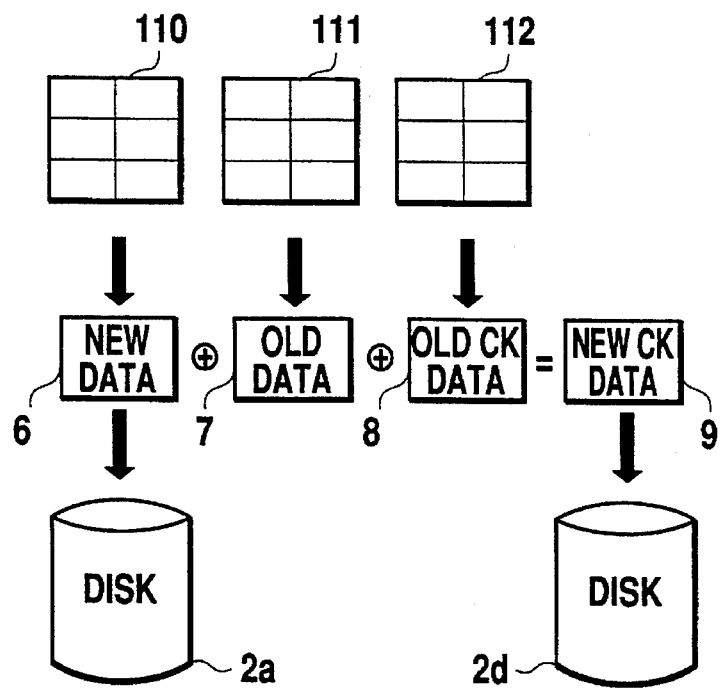
FIG. 15 is a schematic conceptional view of the processing of the memory device shown in FIG. 14.
Figure 16:
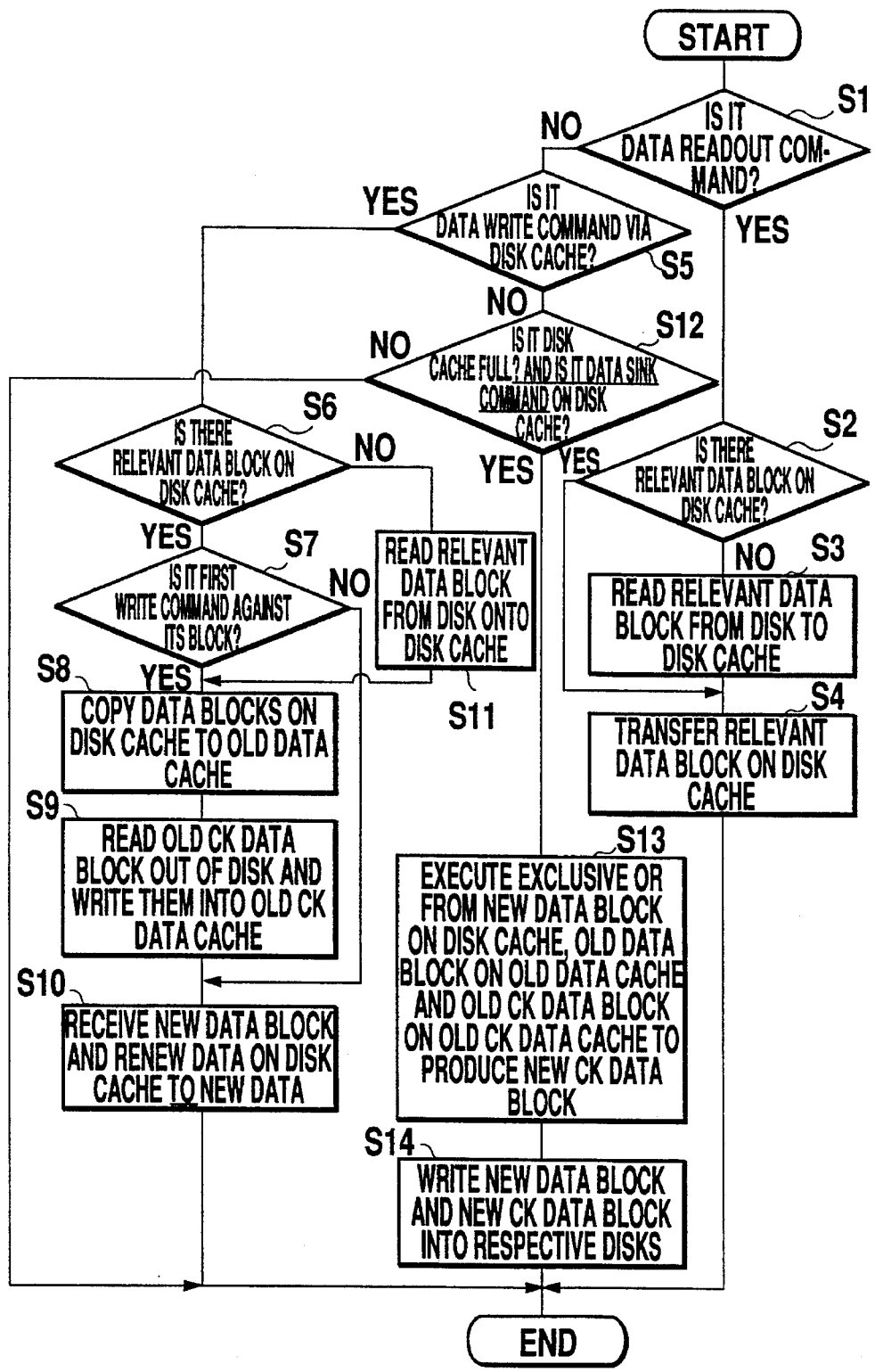
FIG. 16 is a flow chart showing an operation of the memory device shown in FIG. 14.

Next, the operation of the above-described memory device shown in FIG. 14 will now be described in connection with FIGS. 15 and 16. FIG. 15 is a schematic conceptional view of the processing of the memory device shown in FIG. 14, and FIG. 16 shows a flow chart of the processing of the same.

First, it is discriminated whether or not a data readout command is given in the disk array device 1 in step S1. When it is discriminated that it is the data readout command in step S1, it is discriminated whether or not there is a relevant data block in the disk cache 110 in step S2. When it is discriminated that there is no relevant data block in the disk cache 110, the blocks of the data 4a are read from the disk unit 2a to the disk cache 110 in step and then a transfer of the relevant data block on the disk cache 110 is carried out in step S4. In turn, when it is discriminated that there is the relevant data block in the disk cache 110, the processing in step S3 is not performed to move to step S4, and the transfer of the relevant data block on the disk cache 110 is carried out in step S4.

When it is discriminated that it is not the data readout command in step S1, it is discriminated whether or not it is a data write command via the disk cache 110 in step S5. When it is discriminated that it is the data write command via the disk cache 110, the process is moved to step S6

In step S6, it is discriminated whether or not there is a relevant data block on the disk cache 110. When there is the relevant data block on the disk cache 110, it is discriminated whether or not it is the first data write command against the data block in step S7.

When it is discriminated that it is the first data write command against the relevant data block on the disk cache 110 in step S7, the disk array device 1 copies the old data block on the disk cache 110 into the old data cache 111 in step S8. Next, in step S9, the old CK data block is read out of the disk unit 2d to store it into the old CK data cache 112. In step S10, a new data block is received and the data block on the disk cache 110 is renewed from the old data to the new data.

Further, when it is discriminated that it is second or subsequent data write command against the relevant data block on the disk cache 110 in step S7, the process is jumped to step S10 without performing step S8 and S9, that is, the disk array device 1 receives the new data block as it is and renews the data block on the disk cache 110 in step S10.

In turn, when it is discriminated that there is no relevant data block on the disk cache 110 in step S6, the disk array device 1 reads the block of the relevant old data 4a from the disk unit 2a to the disk cache 110 in step S11, and the process is moved to step S8.

Further, when it is discriminated that it is not the data write command via the disk cache 110 in step S5, it is discriminated whether or not the disk cache 110 is full or whether or not it is a data sink command on the disk cache 110 in step S12. When these two discriminations are negative, the entire operation is finished. In turn, when it is discriminated that at least the disk cache 110 is full or it is the data sink command, the process is moved to step S13.

In step S13, the disk array device 1 executes an exclusive OR calculation in the exclusive OR arithmetic unit 3 by using the block of the relevant new data 6 on the disk cache 110, the blocks of the old data 7 on the old data cache 111 and the blocks of the old CK data 8 on the old CK data cache 112 to produce a data block of the new CK data 9. Then, in step S14, the disk array device 1 writes the block of the new data 6 and the block of the produced new CK data 9 into the respective disk units 2a and 2d to finish the entire operation.

In this embodiment, through the above-described operation, when the data on the disk cache 110 are written into the disk units 2a, 2b, 2c and 2d in the disk array device 1, the processing can be performed without reading the old data and the old CK data required for producing the new CK data out of the disk units 2a, 2b, 2c and 2d. Hence, the number of accesses into the disk units 2a, 2b, 2c and 2d is reduced and the quickening of the data writing operation can be realized. Further, when the content in the disk cache 110 is changed, the changed part is necessarily written onto the disk units 2a, 2b, 2c and 2d at an appropriate later time. Hence, the old data and the old CK data stored in the old data cache 111 and the old CK data cache 112 can be exactly used, and an effective cache method of the old data and the old CK data can be performed.

In the above-described embodiments, one disk unit for storing the CK data for every redundant group is provided and the exclusive OR calculation is used for an error correction calculation for recovering trouble of one disk unit and a CK data production calculation. However, two disk units for storing the CK data for every redundant group can be provided and Reed-Solomon codes capable of recovering the corruption of up to two disk units can be used with the result of the same effects as described above.

In the above-described embodiments, although the disk units 2a, 2b, 2c and 2d are used in the disk array device 1, regarding the storage medium, in addition to a magnetic disk, of course, a memory module requiring a relatively long access time, such as a light disk device, a light card device, a semiconductor disk device, a magnetic card, a magnetic floppy disk or the like can be used with the same results as described above.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A memory device with a redundant disk array, comprising:

redundant disk array means having a plurality of data storage means for storing data and a check data storage means for storing check data;

processing means for accessing the redundant disk array means;

first cache memory means for storing old data corresponding to portions of data stored in the redundant disk array means;

second cache memory means for storing the old data of the first cache memory means when the old data of the first cache memory means are renewed with new data;

third cache memory means for storing old check data corresponding to the old data stored in the second cache memory means when the old data of the first cache memory means are renewed;

arithmetic means for producing new check data from the new data, the old data stored in the second cache memory means and the old check data stored in the third cache memory means; and control means for allowing the storing of the new data into the plurality of data storage means and the new check data into the check data storage means in the redundant disk array means.

2. The memory device of claim 1, wherein the first cache memory means is provided in the processing means, and the second and third cache memory means are provided in the redundant disk array means.

3. The memory device of claim 1, wherein the first and second cache memory means are provided in the processing means, and the third cache memory means is provided in the redundant disk array means.

4. The memory device of claim 1, wherein the first, second and third cache memory means are provided in the processing means.

5. The memory device of claim 1, wherein the first, second and third cache memory means are provided in the redundant disk array means.

6. The memory device of claim 1, wherein the arithmetic means executes an exclusive OR calculation by using the new data, the old data stored in the second cache memory means and the old check data stored in the third cache memory means to produce the new check data.

7. The apparatus of claim 1, wherein:

the second cache memory means includes means for storing the old data of the first cache memory means when the old data of the first cache memory means are renewed for a first time with a new data; and the third cache memory means includes means for storing the old check data corresponding to the old data stored in the second cache memory means when the old data of the first cache memory means are renewed for the first time with the new data.

8. The apparatus of claim 7, wherein:

the arithmetic means includes means for producing the new check data from the new data, the old data stored in the second cache memory means and the old check data stored in the third cache memory means when the new data is written to the redundant disk array means; and the control means includes means for allowing the storing of the new data into the plurality of data storage means and the new check data into the check data storage means in the redundant disk array means when the second new data is written.

9. The apparatus of claim 1, further comprising:

means for transferring addresses corresponding to the old data from the first cache memory means to the control means;

and wherein the control means further includes means for accessing data corresponding to the old data from the redundant disk array means by using the addresses corresponding to the old data.

10. The apparatus of claim 1, wherein the data stored in the check means is stored in accordance with RAID 7 architecture with respect to the data stored in the plurality of data storage means.

11. An apparatus comprising:

a plurality of storage elements containing stored data;

a check storage element, containing check data corresponding to the stored data in the plurality of storage elements;

a stored data cache, containing cached stored data corresponding to a portion of the stored data contained within the plurality of storage elements; and a check data cache, containing cached check data corresponding to the cached stored data contained within the stored data cache; and a check circuit, having a first input coupled to the stored data cache, a second input coupled to the check data cache, a third input that receives new data, and an output that provides new check data to the check storage element from a portion of the cached stored data, a portion of the cached check data, and the new data.

12. The apparatus of claim 11, wherein the new check data is an exclusive OR of the portion of the cached stored data, the portion of the cached check data, and the new data.

13. The apparatus of claim 11, further comprising means for storing the new data in one of the plurality of storage elements.

14. The apparatus of claim 11, wherein the apparatus is connectable to a processor having a local data cache.

15. The apparatus of claim 14, wherein a portion of the cached stored data and a portion of the cached check data corresponds to old data replaced in the local cache by renewal data.

16. The apparatus of claim 15, further including means for transferring the old data to the check circuit.

17. The apparatus of claim 15, further comprising means for transferring addresses corresponding to the old data to the check circuit, the apparatus further comprising means for accessing the old data from the redundant disk array means by using the addresses corresponding to the old data.

18. The apparatus of claim 11, wherein the check data stored in the check storage element is parity data stored in accordance with RAID 7 architecture with respect to the stored data stored in the plurality of storage elements.

19. A method for controlling a plurality of storage elements that contains stored data and a check storage element that contains check data, the method comprising the steps of:

storing a portion of the stored data in a disk cache memory as cache data;

storing a portion of check data, corresponding to the cache data, in a cache check memory as cache check data;

writing new data to one of the plurality of storage elements;

creating new check data that corresponds to the new data from the new data, a portion of the cache data, and a portion of the cache check data; and storing the new check data in the check storage element.

20. The method of claim 19, further comprising the steps of:

renewing old data in a local cache;

writing the old data to the disk cache memory when the old data is renewed a first time; and reading old check data, that corresponds to the old data, from the check storage element and storing the old check data in the cache check memory when the old data is written to the disk cache memory.

21. The method of claim 20, further comprising the steps of:

writing write data from the local cache to the plurality of storage elements;

creating write check data that corresponds to the write data, from the write data, the old data, and the old check data;

storing the write data in one of the plurality of storage elements; and storing the write check data in the check storage element.

22. The method of claim 19, further including the steps of:

renewing old data in a local cache;

writing an old data address corresponding to the old data to the disk cache memory when the old data is renewed a first time;

reading the old data from one of the plurality of storage elements using the old data address: and reading old check data, that corresponds to the old data, from the check storage element and storing the old check data in the cache check memory when the old data is read from one of the plurality of storage elements.

23. The method of claim 22, further including the steps of:

writing write data from the local cache to one of the plurality of storage elements;

creating write check data that corresponds to the write data, from the write data, the old data, and the old check data;

storing the write data in one of the plurality of storage elements; and storing the write check data in the check storage element.

24. The method of claim 19, wherein the step of creating new check data includes creating new parity data in accordance with a RAID 7 architecture.

25. An apparatus for controlling a plurality of storage elements that contains stored data and a check storage element that contains check data, the apparatus comprising:

means for storing a portion of the stored data in a disk cache memory as cache data;

means for storing a portion of the check data, corresponding to the cache data, in a cache check memory as cache check data;

means for writing new data to one of the plurality of storage elements;

means for creating new check data that corresponds to the new data from the new data, a portion of the cache data, and a portion of the cache check data; and means for storing the new check data in the check storage element.

26. The apparatus of claim 25, further comprising:

means for renewing old data in a local cache;

means for writing the old data to the disk cache memory when the old data is renewed a first time; and means for reading old check data, that corresponds to the old data, from the check storage element and storing the old check data in the cache check memory when the old data is written to the disk cache memory.

27. The apparatus of claim 26, further comprising:

means for writing write data from the local cache to the plurality of storage elements;

means for creating write check data that corresponds to the write data, from the write data, the old data, and the old check data;

means for storing the write data in one of the plurality of storage elements; and means for storing the write check data in the check storage element.

28. The method of claim 25, further comprising:

means for renewing old data in a local cache;

means for writing an old data address corresponding to the old data to the disk cache memory when the old data is renewed a first time;

means for reading the old data from one of the plurality of storage elements using the old data address; and means for reading old check data, that corresponds to the old data, from the check storage element and storing the old check data in the cache check memory when the old data is read from one of the plurality of storage elements.

29. The method of claim 28, further comprising:

means for writing write data from the local cache to one of the plurality of storage elements;

means for creating write check data that corresponds to the write data, from the write data, the old data, and the old check data;

means for storing the write data in one of the plurality of storage elements; and means for storing the write check data in the check storage element.

30. The method of claim 25, wherein the means for creating new check data includes means for creating new parity data in accordance with a RAID 7 architecture.

* * * * *